US008893026B2

(12) United States Patent
Lindemann et al.

(10) Patent No.: US 8,893,026 B2
(45) Date of Patent: Nov. 18, 2014

(54) SYSTEM AND METHOD FOR CREATING AND BROADCASTING INTERACTIVE PANORAMIC WALK-THROUGH APPLICATIONS

(76) Inventors: Pierre-Alain Lindemann, Bex (CH); David Lindemann, Vérossaz (CH); Gérard Crittin, Port-Valais (CH)

(*) Notice: Subject to any disclaimer, the term of this patent is extended or adjusted under 35 U.S.C. 154(b) by 489 days.

(21) Appl. No.: 13/127,479

(22) PCT Filed: Nov. 5, 2009

(86) PCT No.: PCT/IB2009/007337
§ 371 (c)(1),
(2), (4) Date: May 4, 2011

(87) PCT Pub. No.: WO2010/052550
PCT Pub. Date: May 14, 2010

(65) Prior Publication Data
US 2011/0214072 A1 Sep. 1, 2011

Related U.S. Application Data

(60) Provisional application No. 61/111,346, filed on Nov. 5, 2008.

(51) Int. Cl.
| G06T 3/00 | (2006.01) |
| G01S 19/49 | (2010.01) |
| G01C 11/02 | (2006.01) |
| G06F 17/30 | (2006.01) |
| G01S 19/14 | (2010.01) |
| G03B 37/06 | (2006.01) |

(52) U.S. Cl.
CPC ............ *G01C 11/02* (2013.01); *G01S 19/49* (2013.01); *G06F 17/30241* (2013.01); *G03B 37/06* (2013.01); *G01S 19/14* (2013.01); *G06T 3/0062* (2013.01)
USPC .............................. 715/757; 348/36; 709/219

(58) Field of Classification Search
CPC .. G06T 2200/32; G06T 3/0087; G06T 3/4038
USPC ............................ 348/36; 715/757; 709/219
See application file for complete search history.

(56) References Cited

U.S. PATENT DOCUMENTS

| 2002/0171666 A1* | 11/2002 | Endo et al. | 345/619 |
| 2008/0059889 A1* | 3/2008 | Parker et al. | 715/748 |
| 2010/0020075 A1* | 1/2010 | Edecker et al. | 345/420 |

* cited by examiner

*Primary Examiner* — Sath V Perungavoor
*Assistant Examiner* — Jeffery Williams
(74) *Attorney, Agent, or Firm* — Da Vinci Partners LLC; John Moetteli

(57) ABSTRACT

The system and method provides for creating, storing and broadcasting interactive panoramic walk-through applications. The combination of images is determined by the array of possibilities for the user to choose the direction of displacement at each intersection point and from each point or geographical coordinate, to have a complete view from a first person's point of view. The system uses geo-streaming methods to optimize broadcast and real-time construction of panoramic applications. The system provides a visual perspective which approaches that of human vision.

11 Claims, 7 Drawing Sheets

SYSTEM AND METHOD FOR CREATING AND BROADCASTING INTERACTIVE PANORAMIC WALK-THROUGH APPLICATIONS

This application is the National Stage of International Application No. PCT/IB2009/007337, filed 5 Nov. 2009, which claims priority to US provisional patent application Ser. No. 61/111,346, filed 5 Nov. 2008.

FIELD OF THE INVENTION

The present invention relates generally to systems and methods for generating virtual tours. More specifically, the present invention relates to assembly and broadcast of virtual walk-through applications using panoramic images, 3D images or a combination of both.

BACKGROUND OF THE INVENTION

A virtual tour (or virtual reality tour) is a virtual reality simulation of an existing location, which is usually built using contents consisting principally of 2D panoramic images, sequence of linked still images or video sequences, and/or image-based rendering (IBR) consisting of image-based models of existing physical locations, as well as other multimedia content such as sound effects, music, narration, and text. A virtual tour is accessed on a personal computer (typically connected to the Internet) or a mobile terminal. Although not replacing real travel, virtual tours aim at evoking an experience of moving through the represented space. Virtual tours can be especially useful for universities and in the real estate industry, looking to attract prospective students and tenants/buyers, respectively, eliminating for the consumer the cost of travel to numerous individual locations.

The word panorama indicates an unbroken view, so essentially, a panorama in that respect could be either a series of photographic images or panning video footage. However, the terms 'panoramic tour' and 'virtual tour' are generally associated with virtual tours created using stills cameras. Such virtual tours created with still cameras are made up of a number of images taken from a single view point. The camera and lens are rotated around what is referred to as a nodal point (the exact point at the back of the lens where the light converges). These images are stitched together using specialist software to create a panorama representing a near 360 degree viewing angle, as viewed from a single "view point"; the panoramas are each resized and configured for optimal on-line use. Some 'panographers' will then add navigation features, such as hotspots (allowing the user to "jump" from one viewpoint or panorama to the next) and integrate geographic information such as plans or maps.

Current virtual tours photographic techniques suffer from several limitations. A seamless panoramic image can not be created from still images whenever such still images are captured from different nodal points or, for two consecutive images, from a single nodal point but with different focal lengths or focus distances. Images captured from a single camera rotating on its nodal point can be stitched seamlessly but this solution can not be used for applications involving axial translation, where, for example, images are captured from a vehicle in motion.

Catadioptric optical systems provide images having a 360° horizontal field of view and near 180' vertical field of view. The resulting panoramic images are of a annular shape and generally must be sliced and open and "unwarped" to create a panoramic image of a rectangular shape. The unwarping step causes image distortion which, together with the optical distortions caused by the Catadioptric optics having unevenly distributed angles along its radial axis (vertical axis of the view), must be compensated by specialised application software.

Patent document US 2007/0211955 to Pan discloses a perspective correction method allowing e-panning without image distortion, wherein image correction step is performed on image slices (horizontal section of the wide-angle image) by repositioning each pixel to a corresponding point on a cylindrical surface. This method consumes significant processing power and bandwidth for respectively correcting and transmitting the images whenever fast user motion is involved during navigation, and is therefore not optimal for providing a seamless navigation experience at relatively high user directed panning speed.

Also, with current image capture solutions, objects near the camera are responsible for occlusion on distant objects; "occlusion" meaning, with regard to 2D images, the non-projection of a surface to a point of observation, and with regard to a 3-D space, the effect of one object blocking another object from view. Limitations of current virtual tour technology, such as object occlusion, have had the detrimental result on virtual tours never materializing outside of the real estate industry.

Virtual Walk-Through ("VWT") applications constitute an evolution over virtual tours. This technology eliminates the occlusion limitation by enabling user to travel to a point where distant objects are no longer occluded.

Commercial online walk-through products such as Google "STREETVIEW" provide virtual outdoor walk-through of cities using images captured from a camera mounted on a road vehicle which circulates on motorways and roads at speeds ranging from 30 kmh to 80 kmh. These products are limited to outdoor views wherein any two consecutive points of view are positioned at a relatively long distance from each other. Typically, "STREETVIEW" and applications of the like provide visualisation at road-view level, that is, visiting a city as viewed from a car, wherein the user follows a pathway formed by a plurality of panoramas accessible along main streets, the user following the pathway by "jumping" (generally from a graphical interface allowing clicking of on-screen icons) from a panorama or point of view to the next distant point of view. Google "STREETVIEW" also creates ground plane distortion where planar ground seems to be inclined due to the unwanted motion of the cameras caused by the inertial force. Other current walk-through products "EARTHMINE" (www.earthmine.com by Earthmine Inc., Berkeley, Calif.) provides commercial online walk-through for applications such as management of buildings and assets, telemetric measurement and other cadastral works. The product combines high resolution still images and 3D mesh information to provide pathways wherein a user jumps from one distant view point to another. "EVERYSCAPE" (www.everyscape.com by Everyscape, Waltham, Mass.) provides commercial online panoramic products wherein motion between two consecutive view points is simulated by video postproduction effects. This product does not allow the user to pan and tilt his viewing angle during its displacement along the travel path. During motion, images are no longer panoramic unless the fields of view of images representative of the next fixed point, are constrained to the motion axis.

The prior art covers several techniques that aim at reducing the bandwidth associated with the transmission of panoramic images and applications between a server and the user's remote terminal, allowing a user to navigate a walk-through space while downloading data.

The use of a predefined pathway has been widely adopted to prevent storage and transmission of redundant image data. Predefined pathways have the additional benefit of simplifying user navigation, notably by preventing a user from searching available paths or from hitting objects repetitively during motion, as would he the case when user tries to walk through walls or door images.

U.S. Pat. Nos. 6,388,688 and 6,580,441, both to Schileru-Rey, disclose a computer system and method that allow interactive navigation and exploration of spatial environments, wherein pathways are represented by branches, and intersections in the real environment are represented by nodes. User selects which path to follow from the node. A branch represents a video sequence or animation played during motion between two adjacent view points. Virtual objects can be integrated to specific branches or nodes, without assigning a geographic coordinate to virtual objects; each object is linked to at least one branch or node and displayed when user is travelling on said branch or node.

U.S. Pat. No. 6,968,973 to Uyttendaele discloses a system for providing an interactive video tour, wherein the order of frames to be displayed is determined based on the user-specified direction of motion along the tour path. Scene data includes a branch points table which for each video frame associated with a branch point, identifies the next video frame that is to be played in view of the current viewing direction. Patent 973' does not provide a device to speed up downloading of frames, beyond selection of the next frame, and thus do not permit downloading of data based on anticipated user motion.

U.S. Pat. No. 7,103,232 to Kotake discloses an IBR system with improved broadcasting performance, where a panoramic image is created by stitching several images from several cameras, preferably video cameras, pointing to distinct points of view, the cameras being synchronised by use of a single time code. The '232 system provides panoramic images divided in six images sections of 60° horizontal field of view, and broadcast typically only two of the six sections' image (providing a 120° field of view) at any giving time with an aim to reduce processing power and communication bandwidth. The '232 solution is not optimized however for walk through applications allowing fast movement across the horizontal plane beyond 120°; moreover, the '232 patent does not disclose broadcasting images of different image resolution, meaning that it only covers broadcasting of images of the highest possible image resolution.

U.S. Pat. No. 6,633,317 to Jiang Li discloses a data transfer scheme, dubbed spatial video streaming, allowing a client to selectively retrieve image segments associated with the viewer's current viewpoint and viewing direction, rather than transmitting the image data in the typical frame-by-frame manner. The method of patent 317' divides walk-through space in a grid. Each cell of the grid is assigned to at least one image of the surrounding scene as viewed from that cell. Images may be characterised as a concentric mosaic in that each cell is represented by a sequence of image columns. The method of patent 317' allows transmission of part of the images (compressed or not) needed in an attempt to anticipate the viewer's change of view point within the walkthrough space, starting with image data corresponding to viewpoints immediately adjacent the current viewpoint, with subsequent image data associated with viewpoints radiating progressively out from the current viewpoint. Patent 317' is well suited to open walkthrough spaces where user can move in any direction using multiple sources of image data (simple 2D images, panoramic images or concentric mosaics), such as in a typical 3D environment. However, this method is not suited to the optimal transmission of full panoramic images in situations where the user travels along predefined pathways consisting of several view points in a linear arrangement within a network of pathways within the walkthrough space. Additionally, being view direction sensitive, this method is not optimized in terms of response time so as to allow the user to change his travel plan, for example by making a U-turn or travelling along another pathway. Finally, as this method allows travel in any direction (along predefined pathway), the amount of data download to represent a given view point is greater and therefore less suited for a fast and responsive viewing experience on the Internet or other network media having limited bandwidth.

Consequently, no system of the prior art provides a system optimized for seamless broadcasting of fluid motion where the user can orientate (pan and tilt) the field of view during motion and where the user can stop the motion anywhere along the travel path, in order to discover local objects in detail without occlusion.

U.S. Pat. No. 6,693,649 to Lipscomb discloses a solution for non-linear mapping between media and display allowing "hotspots", defined as an outline of two points connected by straight lines, to be used in the context of panoramas. Such "hotspots" are referenced to each image using two angles or two pixel coordinates and as such, these values are only valid for each distinct image. Patent 649' does not use geographic coordinates based on 3D with an x, y and z axis. Allocation of three dimension coordinates for each virtual objects and determination of precise geographic location information for each view point, according to embodiments of the present invention, are prerequisite for the seamless integration of hotspots and other virtual objects in panoramas, where these objects would be visible from any point having a direct sight line to the object.

Consequently, no prior art system provides a system and advanced features based on geographical information such as the ability to pin an element of information on any location in a view, such element staying spatially fixed to the point during the travel.

The present method and system for creating and broadcasting interactive walkthrough applications overcomes these shortcomings as will now be described.

Given the market need for immersive walkthrough applications, what is needed therefore is a system and method for the real-time assembly and broadcasting of walk-through applications using any combination of 2D panoramic images and virtual 3D images, with optionally virtual objects, that can provide seamless, quality, fluid walk-through navigation.

What is needed is an optimized system or method for the real-time assembly and broadcasting of panoramic walk-through applications providing immersive, interactive and intuitive navigation experience, which allow the user, from each view point or geographical coordinate along a network of pathways, to have a complete view from a first person point of view, the view covering substantially 360° in field of view.

What is needed is a system or method that allows optimising broadcast and real-time construction of panoramic walk-troughs applications, providing ongoing image broadcasting to ensure seamless user motion, wherein the combination of images download anticipates user travel, based on the ability of the user to choose the direction of displacement at each intersection point.

Further, what is needed is a system or method for broadcasting and real-time construction of panoramic applications, wherein the balance between response time (possibility to navigate on different pathways) and fluidity of movement and resolution (characterized by the number of different images available along a given pathway) is optimised.

Finally, what is needed is a system or method for creating and broadcasting interactive panoramic walk-through applications that can provide genuinely interactive functions accessible from the images.

SUMMARY OF THE INVENTION

A system, apparatus and method for creating and broadcasting interactive panoramic walk-through applications is provided. The system has a 2D image acquisition system, comprising a holding device such as a vehicle equipped with a camera connected to a catadioptric optic system providing near 360° field of view, a memory device to store data including images and geographic coordinates information related to these images, a communication device for transferring data from the memory device to a computer, a fixation and stabilisation system connecting the camera to the holding device for aligning the camera perpendicular to the horizontal plane; a computer with a processor and associated software for performing image modification steps; optionally, 3D virtual images; a database for storing data, organized on the principle that each object can he parent or child of any other object; one object may or may not be parent of other objects, and may or may not be child of other objects, wherein image sequences are organised in Route objects and Point objects, and wherein Point objects and Route objects are parents of any image object associated with geographic coordinates; a server with a logical device (processor which executes program instructions) for geostreaming, using a pyramidal structure of classification for the images that allows the progressive download of image sequences from the server; a user computer, including a software player for assembly and broadcasting sequences of images downloaded from the server to the user computer.

The image capture system includes a location measurement device (GPS), a distance measurement device (odometer), and an inertial measurement unit (IMU) for measuring rate of acceleration and changes in rotational attributes (attitude) of the vehicle, fixation device or camera.

The image related data includes the image, date and time of image capture, geographical coordinate's information, and other information, notably image reference and group, so as to identify for example a particular district or street, and camera settings such as aperture, and image related information such as camera model, speed and an ISO reference.

The computer with a logical device for performing image modification steps processes images in two resolutions; low resolution for interactive walkthrough panoramic motion, and high resolution for interactive panoramic motion. The data base classifies each image relative to its geographic proximity to a Cross section point, that is an image representing a location where several Routes are available. The system allows download of images having different resolutions, wherein low resolution images are always loaded first, higher resolution images are loaded conditional to the user stopping its motion for a minimum duration of time, for example of a half second, the higher resolution image being substituted to the low resolution image as soon as the high resolution image is fully loaded on the user computer's software player.

According to a preferred embodiment of the present invention, the combination of images is determined by the possibilities for the user to choose the direction of displacement at each cross section point and from each said point or geographical coordinate, to have a complete view from a first person point of view which covers substantially a 360° field of view.

According to another preferred embodiment, a broadcasting method using geo streaming optimises the speed at which the panoramic applications are broadcast to internet users and constructed in real-time in the Internet browser and/or software player on the user's computer.

It is a further object of the present invention to provide a system or method that allows optimising the broadcast and real-time construction of panoramic applications, wherein the combination of images is determined by the possibilities for the user to choose the direction of displacement at each cross section point, and to have from each point or geographical coordinate along the pathway of displacement, a complete view from a first person point of view covering substantially a 360° field of view.

In order to overcome the bandwidth limitations in network environments, the present invention is additionally directed toward a unique image data transfer scheme that involves streaming the image data so that the viewer can move around in the virtual environment while downloading.

It is another object of the present invention to provide an optimized system or method for broadcast and real-time construction of panoramic applications, for the optimal balance between response time (providing the possibility to navigate over different pathways) and fluidity of movement and resolution (characterized by the number of different images being available along a given pathway).

It is another object of the present invention to provide a system or method for creating and broadcasting interactive panoramic walk-through applications that can combine indoor and outdoor images, based on 2D or virtual 3D images.

DETAILED DESCRIPTION OF PREFERRED EMBODIMENTS

Image Capture System

Figure 1:
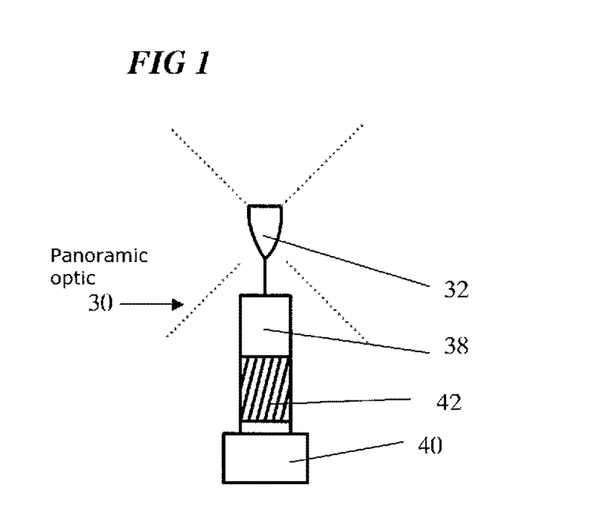
FIG. 1 is a schematic side view of a catadioptric (mirror-based) panoramic optical system.
Figure 2:
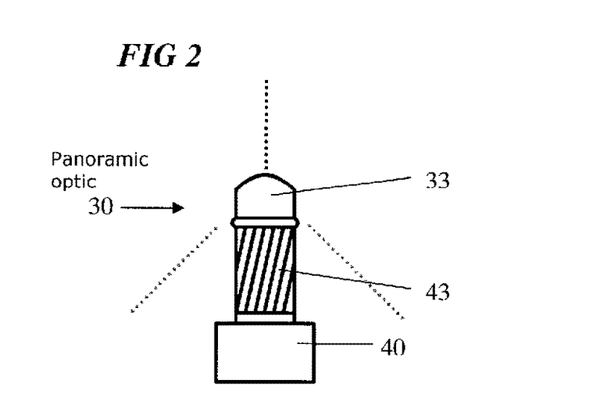
FIG. 2 is a schematic side view of a lens-based panoramic optical system.
Figure 3:
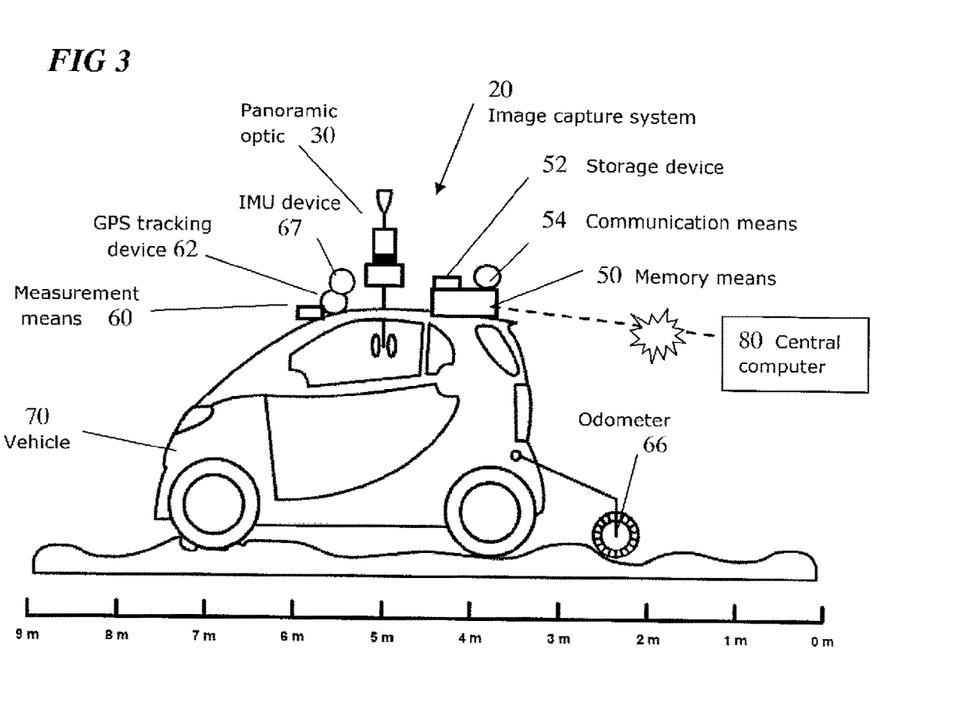
FIG. 3 is a side view showing the vehicle, image capture system, measurement device and attached odometer over a schematic ruler representing distance of vehicle' travel along a road.

Referring now to FIGS. 1-3, an image capture system 20 has a panoramic optic 30, a camera 40 and a memory device 50 such as a computer, mounted on a vehicle 70 or a portable holding device. The panoramic optic 30 is a physical panoramic optic providing 2D panoramic images, comprising either a lens and mirror based optic system (catadioptric system) 32 as shown in FIG. 1, or a physical optical panoramic system 33 (consisting of an ultra wide angle lens or fisheye system with lens providing more than 200° of continuous vertical field of view), without mirror, as shown in FIG. 2. Both systems 32, 33 are commercially available and reflect the substantially 360 degree panoramic field of view into the lens based optics connected to camera 40. The mirror shape and lens used is specifically chosen and arranged such that the effective camera 40 maintains a single viewpoint. The single viewpoint device the complete panorama is effectively imaged or viewed from a single point in space. Thus, one can simply warp the acquired image into a cylindrical or spherical panorama.

The biggest advantage of catadioptric systems 32 and physical optical panoramic systems 33 (i.e., mono camera systems) over multi-camera image capture systems, is the ability to transmit an image essentially free of chromatic aberrations, distortions or discontinuities (i.e., breaks). Moreover, since a complete panorama is obtained on each image shot, dynamic scenes can be captured. A first advantage of a physical optical panoramic and catadioptric system over multiple camera systems is that the former avoids the need to stitch multiple images to create a full panoramic image and that image color and exposure are consistent inside one point of view over the entire 360° range. A second advantage is that the geometric nodal point does not need to be simulated, as is the case with stitched motion images. Moreover, with a physical optical panoramic or catadioptric system, accuracy of objects geometry in the image is not dependent on their distance to the camera. In a multiple camera system, where the nodal point is simulated by software techniques, objects located at proximity of the camera are discontinuous and produce ghost images and artefacts over the resulting panoramic image.

The camera 40 can be any kind of imaging device (conventional camera with chemical exposition film, video camera, etc), but is typically a high resolution digital camera, having CCD or CMOS captors of typically 12 Megapixel resolution or more, with controllable aperture and fast response time of typically 4,5 images/second or more.

Fast response time is required to obtain still images during image acquisition while the vehicle 70 is in motion. Speed of displacement of the vehicle varies; it is typically of 10 km/h and 2.5 km/h for respectively outdoor and indoor image acquisition applications; this provides for a resolution of three to four images per meter (at 2.5 km/h) for indoor applications to one image per meter for outdoor applications (at 10 Km/h). Typical speed and number of images per meter disclosed in this document are provided by way of example and, as such, should not be construed as a limitation to the scope thereof. Images can be captured at higher vehicle velocity; in such higher speed, satisfactorily images can be captured using a lower image resolution or at a lower capture rate allowing fewer view points along a pathway. Identical or higher number of view points may be captured using a faster capture device. Higher or lower density (images per meter) may be achieved based on requirements of specific application and depending on hardware evolution.

In an exemplary embodiment, the digital camera 40 is coupled to a catadioptric optic system 32 by an optic apparatus 42 such as is commercially available from manufacturers such as Nikon and Canon, then, via a standard connector 38 provided by the catadioptric lens manufacturer of each proprietary optical mounting format. The digital camera 40 is coupled with the panoramic lens 33 by an optic apparatus 43 such as those commercially available from the above-identified manufacturers.

The memory device, such as computer 50, receives and stores the images transferred from the camera 40, together with other information received from the measurement device 60 such as geographic coordinates (including altitude) related to said images and orientation, acceleration, rate of rotation on all three axes (attitude) and travel distance information from the capture vehicle and/or measurement device. Memory device 50 is typically a computer installed with an operation system, proprietary software and logical device with multiple processing cores and/or CPU arrangement. Images are distributed from memory device 50 to multiple storage devices 52 to achieve high data bandwidth required by the in-motion image capture method of the present invention. Memory device 50 and multiple storage devices 52 are located onboard vehicle 70 or located remotely. A communication device 54 allow transfer of data from the memory device 50 to a central computer 80. Data is stored in a source database 400 on the central computer 80, wherein each image has a unique ID. Each unique image ID is associated with a specific time reference, the moment of image capture, in the database 400. Because a time reference is needed with high precision, the time reference is given as universal time reference, provided by the GPS unit, which is more universal and precise than an internal computer clock. Without an accurate time reference, the image capture location cannot be retrieved and corrected efficiently.

Data Measurement Device

The measurement device 60 mounted on the vehicle 70 is made up of a GPS tracking device 62 or a similar device able to determine geographic coordinate information from satellite signals, radio signals or the like. Each image is recorded on the memory device 50 or on a central computer 80 with the associated geographic coordinates information of the location of image capture, which is stored either on the GPS tracking device 62 or on a dedicated recording device or on the memory device 50 (such as an on-board computer or on a remote central computer 80). Data is transferred using a communication protocol such as USB, Bluetooth, Ethernet, WiFi, and stored on the destination apparatus in a standard database format.

Geographic coordinates, also referred herein as "GPS data" 162, are stored with a specific GPS universal time reference to images, so as to enable the determination of the exact geographic location at which each image has been taken. Memory device 50 is synchronised to the GPS clock to enable the storage of a universal time reference in association with any stored data.

Because GPS devices have limited precision in altitude tracking, other devices, such as an altimeter or any altitude tracking device can be use in adjunction with GPS devices to enhance the precision of altitude tracking of images. Because GPS device have limited precision in direction tracking, direction may be obtained from an electronic compass or other direction tracking device, thereby enhancing the precision of the recorded image path.

According to an embodiment of the image capture method of the present invention, GPS data 162 are acquired at a rate faster than the rate of image capture by the camera 40, in order to be able to perform advanced analytics and data correction. GPS data 162 can suffer from lack of precision due to a number of causes, which include a generally weak or absent GPS signal. Typically, GPS data is sampled at the maximum sampling rate offered by GPS tracking device 62. This system is described in further detail in concurrently filed PCT application no. PCT/IB2009/007354, to Lindemann et al., entitled SYSTEM AND METHOD FOR THE PRECISE INTEGRATION OF VIRTUAL OBJECTS TO INTERACTIVE PAN- ORAMIC WALK-THROUGH APPLICATIONS, the content of which is incorporated by reference hereto.

An odometer 66 is mounted on the vehicle 70 for indicating distance traveled between any two image locations, thus providing another input for use in improving the precision of the geographic coordinates associated with each image. The odometer 66 may be electronic or mechanical device. The odometer data 166 is sampled at a different rate than the image acquisition or the GPS data acquisition. Odometer sampling is done typically as the maximal rate achieved by the odometer device but at least once per image. Odometer sampling values are stored in a regular data database format with a reference to the GPS global time and, optionally, corroborating GPS position data.

An Inertial Measurement Unit ("IMU") device 67 on board vehicle 70 works by measuring the current rate of acceleration of the vehicle as well as changes in rotational attributes (attitude), including pitch, roll and yaw. IMU data 167 is sampled at a rate independent from the rate of image capture GPS data acquisition, or odometer data acquisition. IMU data is sampled typically at the maximal sampling rate offered by IMU device 67, and at least once per image captured. It should be noted that the vehicle's acceleration or speed does not affect the capture density, which is based on the distance value between any two successive images, as provided by the combination of odometer data 166 and IMU data 167.

Vehicle.

The host vehicle 70, for image capture of outdoor locations, can be any vehicle adapted for circulation on roads such as cars, trucks, or any vehicle adapted to limited circulation areas or indoor circulation such as golf carts or electric vehicles such as mobility scooters (scooters for the handicapped), etc. FIGS. 3 shows vehicle 70 being a small car. For typically smaller, steeper roads as well as image capture of indoor locations, remote controlled vehicles, unmanned vehicles, robots, and in particular stair climber robots, can also be used as the host vehicle 70 for the image capture system 20. Provided with sufficient miniaturisation in commercially available components, the image capture system 20 can also be carried by a human and, for some special applications, by small animals like rats. Depending on the terrain, a flying machine can be used, wherein the odometer function is emulated by the use of GPS data or/and triangulation using radio signals. Triangulation techniques using radio signal require that at least two emitters be located at respectively known, spaced-apart positions.

Logical Device for Performing Image Modification Steps

According to a preferred embodiment of the present invention, source images 210 (2D panoramic images) from the image capture system 20 are modified using a processor executing software instructions using known components available on a central computer 80. The images modification steps include the steps of unwarping, compensation of vertical distortion, expansion of horizontal edges and two point perspective distortion, in order to obtain final release images from panoramic images and images from a 3D scene, which that can be broadcasted by a web server 82.

Use of Virtual 3D Images Instead of Real Camera Image

The system of the present invention also allows the use of 3D virtual images, either alone or in combination with 2D (optical) panoramic images, for the purpose of creating and broadcasting interactive panoramic walk-through applications. A suitable system and method for creating interactive panoramic walk through applications is described in concurrently filed PCT application no.PCT/IB2009/007335, to _Lindemann et al., entitled SYSTEM AND METHOD FOR CREATING INTERACTIVE PANORAMIC WALK-THROUGH APPLICATIONS, the content of which is incorporated by reference hereto. This system and method provides a means in which source panoramic images and virtual 3D scenes may he modified, and allows a convincing immersive navigation environment that is visually as close as possible to human vision during panoramic motion (view point rotation, horizontal displacement inside one panoramic image), or translation motion (view point moving in space forward or backward from any object), irrespective of motion speed.

Management of Images

Figure 4:
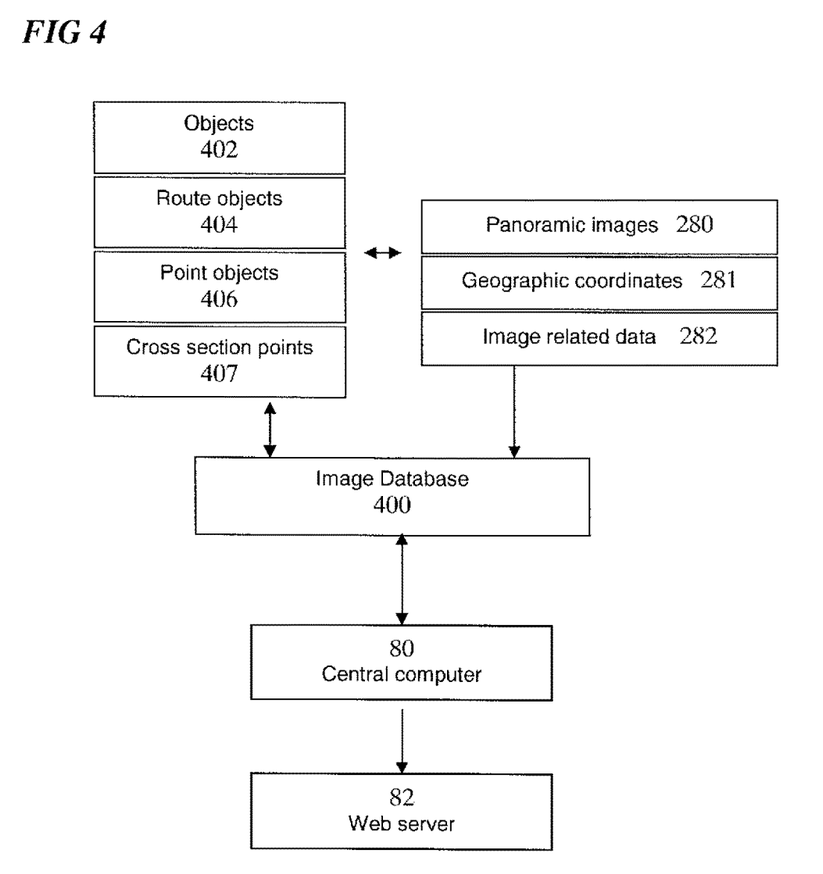
FIG. 4 is a chart showing the organization of the object-based database.

Referring now to FIG. 4, according to a preferred embodiment of the present invention, resulting panoramic images 280 are stored on the central computer 80, each image being associated with tridimensional (x-y-z) geographic coordinates 281 indicative of the image's location of acquisition and optionally image-related data 282 such as date of capture, including date and time of capture; project name or name of location; image group, so as to identify for example a particular district or street; digital photography settings, such as aperture settings, speed, ISO reference, exposure, light measurement, camera model and mounted photographic filters such as UV, neutral gray, etc.; vehicle information such as vehicle speed and model; and camera operator identification.

Precise reference to the geographic coordinates 281 indicative of the image's location of capture allows, among other things, the combination or the superposition of panoramic images of the present invention with any other heterogeneous geo-referenced digital information. Views of a street can therefore be combined with data of a GIS ("Geographic Information System") application, such as, for example, layers of the utilities' services infrastructure (water, cable, electric distribution infrastructure) or commercial information such as a contact information window or a menu window for a local restaurant.

According to a preferred embodiment of the present invention, resulting panoramic images 280 (originating without distinction from optical panoramic images or from resulting images of a virtual 3D scene) can be combined to create and to broadcast panoramic walk-through applications using an image database 400 constructed using an object based model (each panoramic image being an object on the image database) and a network topology constructed pursuant to the principles below:

(i) Each object can be parent or child of any other object; one object may or may not be the parent of other objects, and may or may not be a child of other objects.

(ii) Images sequences, meaning at least two panoramic images captured from distinct view points are organised in route objects 404 and point objects 406. Route objects and point objects are parents of any image object 402 that have associated geographic coordinates.

(iii) Each image object 402 includes a reference to at least one digital file containing at least one panoramic image that has associated specific geographic coordinates.

(iv) Each route object 404 includes a reference to one or more image objects 402. Image objects 402 are organized sequentially as a step along said route (i.e., the "pathway" mentioned above).

(v) Each point object 406 refers to an image object 402 that contains geographic coordinates.

(vi) A Route object 404 is a sibling of at least two point objects 406, or of a point object and a Cross Section point 407; a point object is a sibling of one or more route objects; a point object that is sibling of two or more routes is a Cross Section point 407 (that is, an image representing a location where several Routes are available).

(vii) Each image object 402 is represented by at least two digital files corresponding to the same panoramic image but having different formats, namely, a low resolution file 408 being a panoramic image in low resolution, and a high resolution file 409 being a panoramic image having high image resolution. Therefore, each panoramic image object 402 in the data base refers to two digital files 408, 409.

The data base includes the computer logic adapted to classify each image relative to the geographic coordinates of its location of capture, and to its logical proximity to a point 406. Logical proximity is defined, with reference to an image, by the existence of a reference to routes connected to said point 406, or by a reference to routes connected to a least one point connected to routes connected to said point 406. Logical proximity decreases in direct relationship to the increase in the number of routes and point objects that are connected between the image and the point 406. Whenever an image is connected to point 406 thru more than one path (defined as a route connected to a point connected to a point), only the shorter path (with fewer routes and points) is used to determine logical proximity.

Resolution and Dynamic Loading

As mentioned above, efforts are made such that all panoramic images are available in two or more resolutions; a low resolution for interactive walkthrough panoramic motion (navigation along a route), and a high resolution for interactive panoramic motion (motion within an image). Of course, images of different resolution can be acquired separately at the point of view but, typically, only images of high resolution 408 are acquired, and then a logical step is applied on the source images to derive images of lower resolution 409. The images of high re-solution are suitable for printing or zooming in the image.

According to a preferred embodiment of the present invention whose goal is increasing response time and fluidity of navigation in walk trough applications, the web server 82 includes geo-streaming instructions executable by a processor that allows download of panoramic images available in different image resolutions, as further described as follows, wherein:

(i) Low resolution images 408 are always loaded first in any image sequence ;
(ii) High resolution images 409 are loaded in an image sequence only after a user stops the travel motion on path in the panoramic walk-through player 501, and "stays" on one image for a sufficient amount of time allowing user to examine image details, that is typically about half a second in minimum;
(iii) A high resolution file is substituted to the low resolution file on user display as soon as the high resolution file is fully loaded on the user's player 500, which is located on the user's computer 501.

Panoramic images of the present invention can be edited and stored in further different versions having for example specific resolution, date, and inclusion or exclusion of image masks, in order for example for the image to include or not a mask representing an advertising message that may be available or not to a user or the advertising to be specific according to the context of use of the image sequences, depending of such criteria for example as the day and time, geographic location or language of the user, or location of the internet portal from which the user have access to the panoramic walk-through.

Assembly of Images, Geo Streaming and Broadcasting

According to a preferred embodiment of the present invention, the system 20 and method for creating and broadcasting panoramic walk-through applications includes instructions for executing steps to organize image objects and other data using a pyramidal structure of classification which allows the progressive download of panoramic images from web server 82 for assembly and broadcast on a User's computer 500, with a view to optimizing broadcasting performance in terms of response time, fluidity of movement and motion resolution. In the context of the present invention, "response time" is characterized by the possibility for the user to navigate over different pathways using Route objects 404. Note that generally two pathways are accessible from any point Object 406, corresponding to two opposite directions from a point Object 406. "Fluidity of movement and motion resolution" is characterized by the larger number of different images possibly available along a given pathway or Route object 404.

The logical device (a processor executing instructions on a computer) which organizes data using a pyramidal structure of classification is located typically on central computer 80 and replicated on the webserver 82. The Geo-streaming method of the present invention optimises the navigation performance and generally improves the performance of the system by helping avoid delays at the user end caused by data buffering. The goal of this method is the lowering of the volume of information not yet available on User's computer 500 at the time of user displacement, this lacking information consisting principally of images not yet loaded at any given time for a particular pathway. The method provides for a generally ongoing, if not constant, flow of data, from the webserver 82 to the user's computer 500, which improves the immersive experience of navigating through panoramic applications.

The optimization of performance of the present invention is qualified principally by evaluating the following criteria:
Download/Response time;
Fluidity of movement during user navigation;
Flexibility, to maximise the possibility for the user to take different pathways; and
Non interruption of the data flow and non-interruption of the user motion.

According to a preferred embodiment of the present invention, a method and system 20 thereof to classify panoramic images and to manage image broadcast referred to as "Geo streaming" herein allows the ongoing transmission of data to users, based on the anticipation of user displacement along pathways (also referred to as "walk-through" or "navigation"), that is, the possibility of future displacement in different possible directions.

Images are broadcasted one at a time and "pushed" to the user, wherein images representative of possible different pathways are selected by the web server 82 and transmitted to the user's computer 500 remotely via a communication network, typically the Internet, in order for the data to be available on the local panoramic walkthrough player 501 on user's computer 500 before said data is "requested" by user, that is when user navigates along a pathway.

The Geo-streaming is depended upon relationship between images and route objects 404, point objects 406 and cross sections 407, and is organized according to the following rules:

(i) Each panoramic image is classified relative to its geographic proximity to at least one cross section point 407 or point object 406.

(ii) The structure of the pyramidal classification prioritizes images for download that are representative of pathways possibly accessible to the user.

The selection of images to be broadcasted in sequence is determined as follow:

Selection of next image to be broadcasted is dependant upon the last image broadcasted and displayed to the user.

Images are sorted from the different pathways that are available to the user, from the location of the last displayed image or from any point located next to the location of the last displayed image.

Contrary to what might be considered common sense, images are not downloaded in order following an available pathway, that is, starting from the image representative of a point 406, 407 that is located closer to the last displayed image along a pathway in the direction of the user's view or movement, to the next closer image, etc. Rather, according to the pyramidal classification of the present invention, images that are further away from the last displayed image are downloaded before other images that are located immediately next to the last displayed image. Download according to the classification of the present invention herein provides the user the option to initiate navigation with a minimum delay once the panoramic walkthrough player 501 starts, without waiting for the full download of image representing complete portions of pathway.

Only relevant information is considered, in order to provide images in order to obtain an ongoing if not constant broadcasting speed.

At a higher speed of displacement along a pathway, images located at intermediate points may not be downloaded and/or not displayed at all.

When a movement is selected for which no image is immediately available (already downloaded), then the system selects the next image along the pathway, until the system finds an immediately available image (already downloaded), at which point the system displays the found image.

According to the Geo-streaming method of the present invention, Images are downloaded in dichotomic order, with regard to each pathway accessible from the last displayed image. First, an image is located half way along the pathway, the pathway is then cut in two parts, an image is loaded at the half way point of each part, each part is divided and the system continues to download images located at half way points of the new parts unless there is no more remaining image to load for this pathway.

Figure 5:
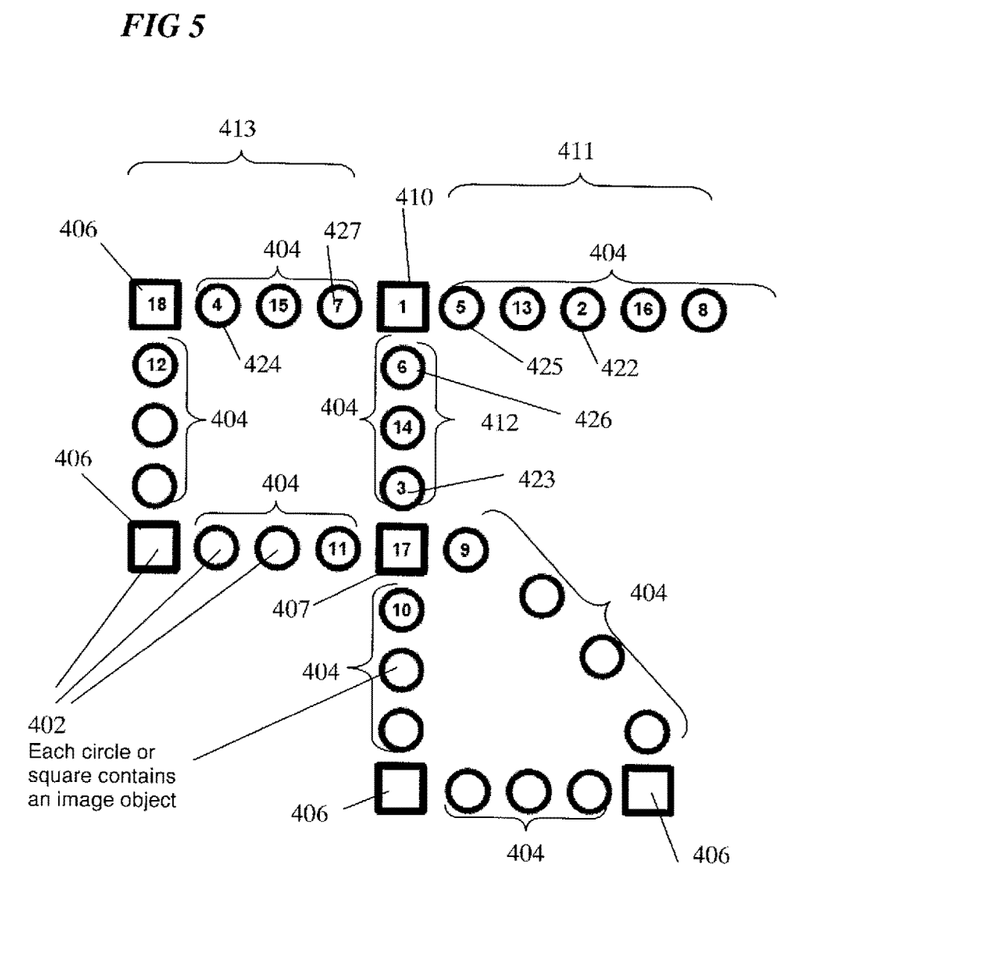
FIG. 5 is a schematic view of a pathway plan representing views taken at different geographical coordinates, with intersection points, wherein the user has the capability to choose the direction of displacement at each intersection point.

Referring now to FIG. 5, a schematic view of a pathway plan representing views taken at different geographical coordinates, with intersection points, in which the user has the capability to choose the direction of displacement at each intersection point. Numbers 1 to 18 inserted at centre of objects represent the pyramidal precedence of loading images, based on last download image location (number 1); images are loaded in numerical order starting with number 2, until the system reaches either maximum memory buffer, maximum distance, or the user initiates motion to a new location.

In further detail, classification and order of download of image pathways are represented by Route objects 404 and image objects 402 numbered from "1" to "18" at the center of each object, wherein the last displayed image 410 is numbered as "1". Point Objects 406 and Cross sections 407 are represented by square shape elements. From last displayed image 410, three pathways are possible, "right" direction pathway 411, "down" pathway 412 and "left" direction pathway 413. Therefore, the system of the present invention will pre-load and broadcast one image representative of each possible pathway, starting with the direction of view by the user on the last displayed image 410. Provided the user is viewing in the direction of the right pathway 411 and that user is moving while images are downloaded, the second image broadcast will be an image located further away along pathway 411, namely image object 422, followed by an image located further away on pathway 412, that is image object 423, followed by an image located further away on pathway 413, that is image object 424, followed by the image located closer on pathway 411, that is image object 425, followed by an image located closer on pathway 412, that is image object 426, followed by an image located closer on pathway 413, that is image object 427, and followed by images located adjacent to the cross sections located closer from last displayed image, that is images numbered "9" to "12", and finally followed by interval image located in between any two images already downloaded.

Cache Optimisation Mechanism

According to an embodiment of the present invention, a cache optimisation mechanism determines if there is a need to load an image, based on the relation between images and routes, and has the purpose of improving image broadcast performance. Once all pathways are loaded, that is all images that are predictably needed for the user to navigate along possible pathways at a reasonable distance are downloaded from the web server 82 to the memory on user's computer 500, the system of the present invention will further load images that are located near the loaded pathways' extremity more distant from last displayed image. As soon as these additional images are loaded in the computer 500 main memory, the system will offload it from the user's computer 500 main memory; if this image is not needed at this time, the image remains in the Internet browser cache on the hard disk of the main computer 500. By this mechanism, the system 20 places, by anticipation, several images in the internet browser cache on the hard disk of the user's computer 500 in order to permit ultrafast reloading (hard disk to memory) without unnecessarily filling the main memory of user's computer 500. The broadcasting system 20 of the present invention keeps index records of these images on user's computer main memory. This index consists of a list of images located on the internet browser's cache (loaded and unloaded by the mechanism) in order to prevent multiple loading of the same data. This mechanism stores, in advance, images in the browser cache which constitute many pathways in the proximity of the current loaded pathways, in order to speed up subsequent user motion. As soon as an image is no longer useful, for example, in the case where images previously displayed are no longer in the proximity of the currently displayed image, the no longer useful image is offloaded from the main memory of the computer 500, but remains on the Internet browser cache for further use, typically when the user returns on his path—goes back on his travel—or replays a sequence.

Assembly of the Panoramic Walkthrough Applications

Figure 6:
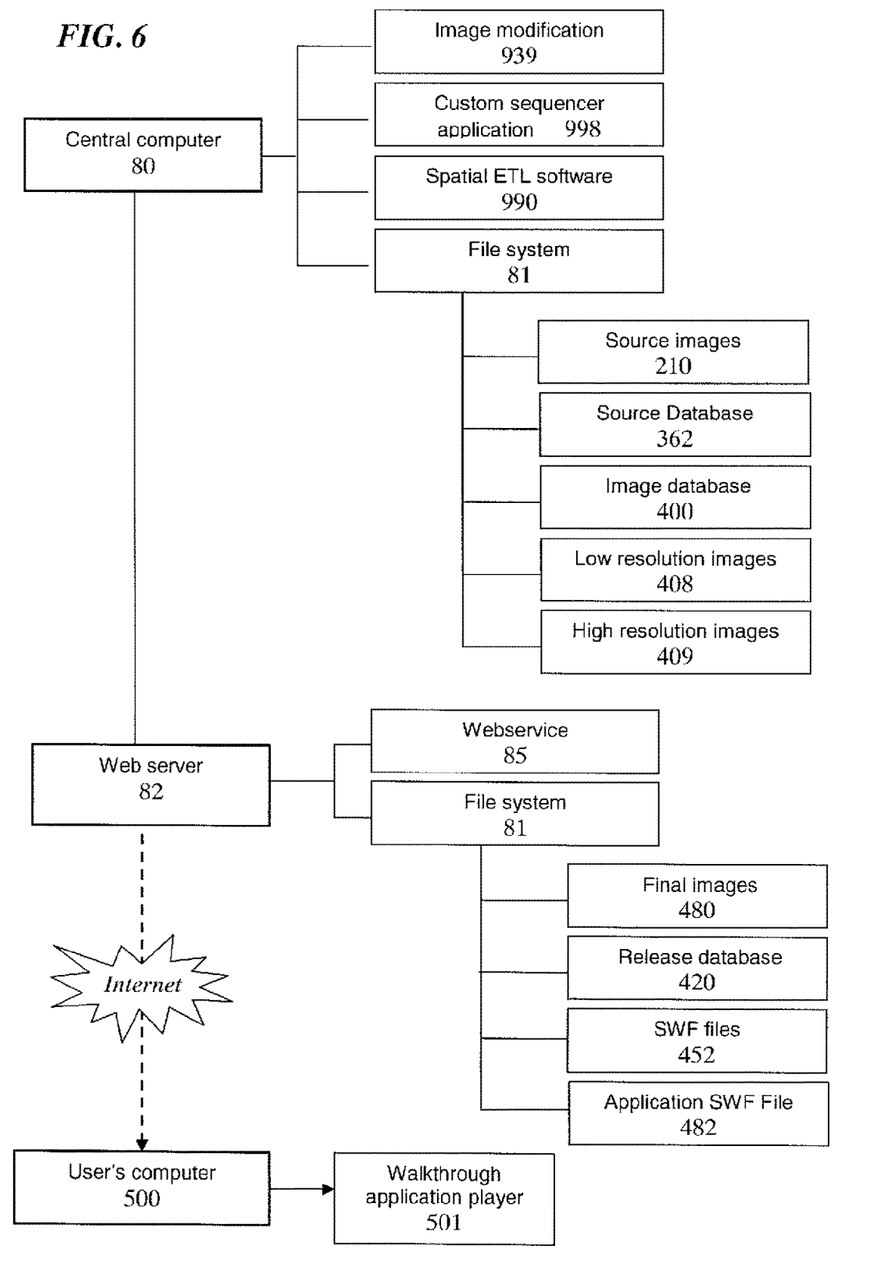
FIG. 6 is an organisation chart showing the hardware components, software components and data involved in the modification and broadcasting of panoramic images.
Figure 7A:
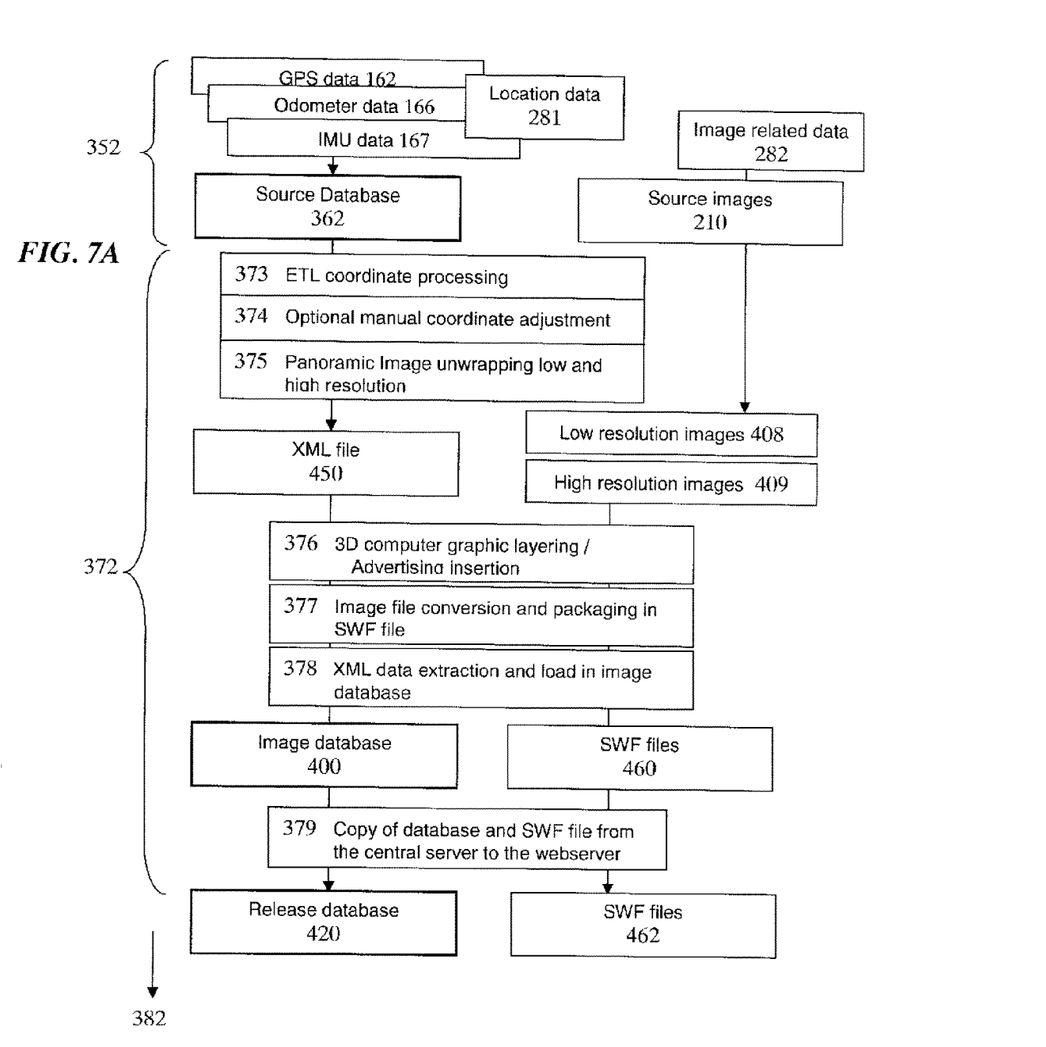
FIG. 7A and 7B represents a flow chart showing the steps involved in the assembly of panoramic walkthrough applications.
Figure 7B:
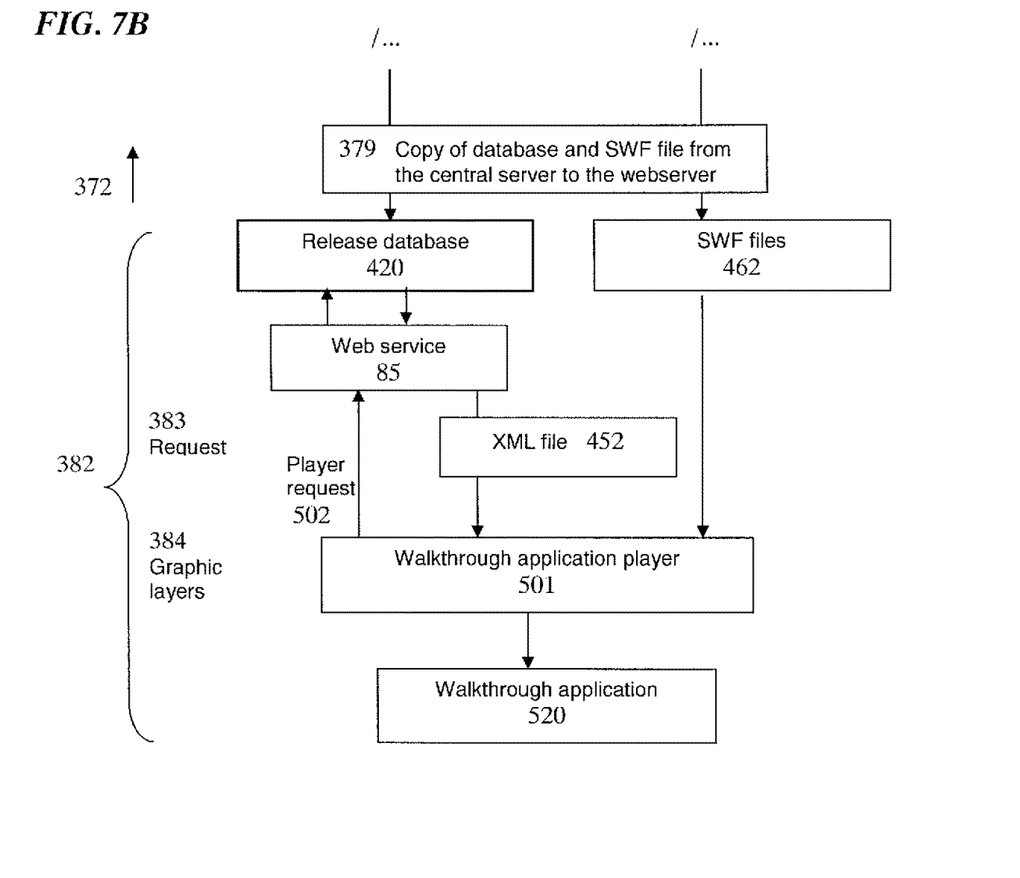

According to a preferred embodiment of the present invention, the method of assembly of panoramic walk-through applications implements the following steps, shown graphically in FIGS. 6, 7A and 7B.

In a first step, a "source database" source images 210 are indexed in a source database 362 on a central computer 80, and stored in a file system 81. Source images are indexed with reference to image related data 282 including, but not limited to, name, timestamp (the image capture time given by the GPS device the universal time), data acquisition session identifiers (a computer generated unique identifier that identifies a given image acquisition process), sequential identifiers (which identify each image sequentially based on image acquisition order), and with reference to location data 281 including geographic coordinates of the image acquisition location and odometers data 166. The source database 362 comprises also GPS data 162, IMU data 167 and other measurement information that is provided by the image capture process and not necessarily related to images information.

In a second "file conversion" step 372, image files are further edited and converted into a format allowing broadcasting by web server 82 and playback on the user computer 500, comprising the following sub-steps.

In a "ETL coordinates processing" sub-step 373, known Spatial ETL software engine 990 performs extracting, transforming and loading ("ETL") functions to effect the 2D or 3D geometric conversion used in geographical information systems, and is used with specifically designed software script to process and merge GPS data 162, odometer data 166 and IMU data 167 together, using trigonometry to define the exact geographic position of each image in 3D space. Spatial ETL software is remote controlled by a custom sequencer application 998 which executes scripted processing in sequence for each source database. One source database is typically created for each image capture session.

In a subsequent "manual coordinates adjustment" substep 374, geographic position of a given source database is converted in a format readable and editable by CAD (Computer Assisted Design), GIS (Geographic Information System) and 3D software systems, wherein a software script is used to convert geographic position data into an XML file 450 that is produced in order to temporary store the information related to each image 402, route 406, point 404 and cross section point 407, including all coordinates and references to all images. This XML file 450 is a static representation of the object model.

In a "panoramic image unwrapping" substep 375, each source panoramic image 210 is edited in release format 280 pursuant to steps of unwarping, compensation of vertical distortion and expansion of vertical edges.

In a "3D computer graphic layering" substep 376, a commercially available 3D software package is used to combine virtual 3D images with panoramic images, for example by inserting 3D objects such as virtual advertizing panels and other objects on panoramic images. Creation and management of 3D objects (e.g., advertising) can be remotely controlled using dedicated software, consisting typically of a custom script and plug-ins driven by a custom sequencer application 998, in order to position, mask, render and store panoramic compressed images, in low resolution 408 and high resolution 409, wherein the 3D objects are inserted in each image at a 3D position based on each image's geographic coordinates available in the XML file 450.

In a 'packaging in SWF file' substep 377, file conversion software is used by the custom sequencer application 998 to convert images 408, 409 into a format dedicated for playback in a web browser, such as the ".swf" file format for Adobe Flash Player, wherein the XML file 450 is read to find image objects 402, route objects 404, point objects 406 and cross section objects 407. Based on the relationship between objects in the XML file 450, images 408, 409 are converted in SWF file 460 in order to maximize download efficiency based on the Geo streaming method of the present invention as described above, wherein:

each SWF file 460 may contain at least one image, each high resolution image 409 is packaged in its own SWF file 460, for each point object 406 and cross section point 407, image is packaged in own SWF file, and for each of the Routes 404, low resolution images 408 may he packaged together in one or more SWF file.

The XML tile 450 is edited to replace reference to compressed image files 408, 409 with a reference to SWF files 460. The number of SWF files 460 and number of images packaged in each SWF file 460 may vary according to the object topology rules illustrated in FIG. 5, above, and the geostreaming method of the present invention.

In a "XML data extraction" substep 378, object information and relation topology described in the XML file 450 are then extracted from the XML file and inserted in the main Object model (not shown) on the image database 400 by the custom sequencer application 998.

In a "Copy of database to the web server" substep 379, image database 400 and SWF files 460 are copied from the Central computer 80 to the Web server 82, wherein image database 400 is copied on the web server 82 as a release database 420, and SWF files 460 are copied in web server 82 as file system 470.

Web service 85 accesses database 420 and reads objects and relations thereto and converts the objects and relations from database 420 into an XML file 452 dynamically; said XML file 452, which is comparable to XML file 450, contains object, relations and references to the SWF file 462 that contains the panoramic images 232. XML file 452 can describe any subset of objects and relations from the release database 420. To define subsets, the Web service 85 located on web server 82 includes all objects having geographic coordinates located within a geometric buffer of circular shape that is centered on the position of the user's last viewed image position 502 transmitted by the Walkthrough application player 501.

In a third "making of the application" step 382, according to and following the selection of images by the user and the use of the geo-streaming method of the present invention, a walkthrough application 520 is assembled using the following substeps:

In a first substep 383, a request containing the last viewed image position 502 is send by the Walkthrough application player 501 to the Web service 85. The Web service 85 interrogates the release database 420, then constructs and sends XML files 452 that correspond to the requests.

In a second substep 384, after a request containing last viewed image position 502 is send by the Walkthrough application player 501 to the Web service 85, graphic layers consisting of objects (typically, 2D icons or images and 3D polygonal objects) are obtained by the Walkthrough application player 501, which displays it on screen using a layering engine, wherein:

The communication link between the layering engine and release database 420 is bi-directional thru the Web service 85;

Said bidirectional link is used to load and to edit 3D polygonal objects in Walkthrough application player 501 and to reintroduce 3D polygon objects in release database 420, allowing online editing of graphic layers, and online addition of meta data for to be used displayed in conjunction with images from any location.

Final Images 480 and files are combined in the Walkthrough application player 501, which embeds the complete structure of the application.

SWF file 482 (Application SWF File) containing the Walkthrough application player 501 are stored on the web server 82. Interactive panoramic application files 482 are compiled in ".swf" Adobe Flash format for wide seamless distribution of the Walkthrough application player 501.

Compiling interactive panoramic application files 482 in .swf Adobe Flash format allow interactive binary file compiling of all graphic and image elements. This binary file can be executed on many computer devices using the Adobe Flash Player Plugin or Component, typically any computer or mobile device such as a mobile phone, in which case, only lower resolution images 408 would be used.

Interactive Graphic Layering

The system and method of the present invention implements software wherein graphic layers are used to define 2D icons, as well as 2D images or polygons, defined herein as 3D objects having assignable 3D coordinates. Said 3D objects can be superposed over any panoramic image, by defining 3D coordinates for the 3D objects and 2D icons that are similar to coordinates of any object visible on a panoramic image. Superposition can be used, for example, to define a door or to enhance the visibility of the boundaries of a park. When appearing on a played sequence on the walkthrough application player 501, 3D objects and 2D icons can react typically to user feedback, from a standard mouse event such as click and rollover, by triggering any scripted action, such as the actions of:

opening external data, which is performed by opening an URL Internet link;

broadcasting polygon data inside event in Javascript; or any scripting language; and calling a custom method on any custom third party Web service on any third party webserver.

Any number of custom scripted actions can be defined for each 3D object.

Unlike standard 3D computer graphic layering, Interactive Graphic Layering of the present invention is processed in real time at runtime in the walkthrough application player 501. This runtime behavior allows interactively adding, removing, hiding, and showing objects. An object can be displayed only if it matches an application context; for example if the user searches for "dinner" only "food related" objects are displayed; if user changes his search context to "cinema", then only objects related to "movie theatre" or "cinemas" are displayed, and objects related to food are no longer displayed.

Interactive Graphic Layers are defined as a set of data in a 3D space compatible with the geographic coordinates of the present invention, wherein the graphic layers can be superimposed on panoramic images and being visible during walkthrough navigation. Specific interactive graphic layers, consisting typically of GIS data, can be defined, managed and integrated to the walkthrough applications of the present invention, for any specific purpose. The interactive graphic layering allows fast and efficient means for building complex custom walkthrough applications having rich interactive features. Events produced by the Walkthrough application player 501 can be broadcasted to external web applications Of web page components, using a standard JavaScript event listener (an "event" is defined as a software message send to any software that registers, on behalf of the user, to listen to such message and is a common software method allowing communication between different software parts or modules, especially when such modules come from third parties). Event broadcasting allows extending the use of interactive graphic layering and permits interoperability with third party custom web components (examples of interoperability include, without limitation, adding a point on a Google Map application at a location where the user clicks on an interactive graphic layer, or to open a popup window displaying information related to the geographic location where the graphic layer has been placed). Each 3D object and 2D icon can be managed from Web server 82 and personalised, wherein the properties of a polygon can be defined with regard to any location and for each user and each context.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment. In some instances, some features of the present invention may be employed without a corresponding use of the other features. Accordingly, it is appropriate that the foregoing description be construed broadly and understood as being given by way of illustration and example only, the spirit and scope of the invention being limited only by the claims which ultimately issue in this application.

What is claimed is:

1. A system for processing interactive panoramic walkthrough content, the system comprising: a computer having instructions for executing image modification steps; a database for storing data, organized on the principle that each object can be parent or child of any other object; one object may or not be a parent of other objects, and may or not be a child of other objects, wherein image sequences are organised in Route objects and Point objects, and wherein Point objects and Route objects are parents of any image object associated with corresponding geographic coordinates; and a server with logical device for geostreaming, using a pyramidal structure of classification for the images that allows the progressive download of images from the server for assembly and broadcast.

2. The system of claim 1, further including an image capture apparatus comprising:
(a) a camera;
(b) an optic system connected to the camera, the optic system providing a substantially 360° field of view,
(c) a communication device for transferring data from the memory device to a computer;
(d) a fixation and stabilisation system connecting the camera to a vehicle adapted to align the camera perpendicular to the horizontal plane.

3. The system of claim 2, wherein the image capture apparatus further comprises a memory device to store data including images, geographic coordinates information related to said images and distance information.

4. The system of claim 2, wherein the image capture system comprises a location measurement device and distance measurement device.

5. The system of claim 4, wherein the image capture system comprises an inertial measurement unit for measuring rate of acceleration and changes in rotational attributes of the vehicle, fixation device or camera.

6. The system of claim 3, wherein the data includes the image, date and time of image capture, geographical coordinate information, project related identifier, group identifier, so as to identify a particular district or street, and camera settings.

7. The system of claim 1, wherein a processor executes instructions for performing image modification steps, and processes images in two resolutions; low resolution for interactive walkthrough panoramic motion, and high resolution for interactive panoramic motion.

8. The system of claim 1, wherein the data base classifies each image relative to its geographic proximity to a cross section Point, defined as an image representing a location where several Routes are available.

9. The system of claim 1 having a processor encoded with instructions for geostreaming, wherein the system is adapted for downloading of images on the server having different resolutions, the system further adapted for loading low resolution images first; loading higher resolution images conditional to the user stopping his motion for a minimum time; and substituting higher resolution image for low resolution images as soon as the high resolution image is fully loaded on the user computer's software player.

10. The system of claim 1 for processing interactive panoramic walk-through content, wherein the database classifies each image relative to its geographic coordinates of its location of capture, and to its logical proximity to a point, wherein logical proximity is defined, with reference to an image, by the existence of a reference to routes connected to the point, or by a reference to routes connected to at least one point connected to routes connected to the point and wherein logical proximity decreases in direct relationship to the increase in the number of routes and point objects that are connected between the image and the point, and wherein, whenever an image is connected to point through more than one path, only the shorter path is used to determine logical proximity.

11. The system of claim 1 using a processor having instructions encoded thereon for geostreaming, wherein geostreaming is adapted to be performed in a manner dependent upon relationships between images and route objects, point objects and cross sections, and is organized according to the following rules:

- each panoramic image is classified relative to its geographic proximity to at least one cross section point or point object;
- the structure of the pyramidal classification prioritizes images for download that are representative of pathways possibly accessible to the user, wherein the selection of images to be broadcasted in sequence is determined as follows:
- selection of next image to be broadcasted is dependant upon the last image broadcasted and displayed to the user;
- images are sorted from the different pathways that are available to the user, from the location of the last displayed image or from any point located next to the location of the last displayed image.

\* \* \* \* \*